US009785477B2

(12) United States Patent
Childress et al.

(10) Patent No.: US 9,785,477 B2
(45) Date of Patent: Oct. 10, 2017

(54) PROVIDING A POLICY HIERARCHY IN AN ENTERPRISE DATA PROCESSING SYSTEM

(75) Inventors: Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 2318 days.

(21) Appl. No.: 11/422,100

(22) Filed: Jun. 5, 2006

(65) Prior Publication Data

US 2007/0282652 A1    Dec. 6, 2007

(51) Int. Cl.
G06Q 10/00    (2012.01)
G06F 9/50    (2006.01)
G06Q 10/06    (2012.01)

(52) U.S. Cl.
CPC ....... G06F 9/5061 (2013.01); G06Q 10/0631 (2013.01); G06F 2209/505 (2013.01)

(58) Field of Classification Search
CPC ............................ G06Q 10/00; G06C 30/0217
USPC ................ 705/7–9, 7.11–7.42; 709/226, 229
See application file for complete search history.

(56) References Cited

U.S. PATENT DOCUMENTS

| 5,951,694 A | 9/1999 | Choquier et al. |
| 6,047,323 A * | 4/2000 | Krause .......................... 709/227 |
| 6,230,183 B1 | 5/2001 | Yocom et al. |
| 6,230,200 B1 | 5/2001 | Forecast et al. |
| 6,564,216 B2 | 5/2003 | Waters |
| 6,571,288 B1 | 5/2003 | Sarukkai |
| 6,785,827 B2 | 8/2004 | Layton et al. |
| 6,801,949 B1 | 10/2004 | Bruck et al. |
| 6,859,798 B1 | 2/2005 | Bedell et al. |
| 6,859,830 B1 | 2/2005 | Ronneburg et al. |
| 6,886,035 B2 | 4/2005 | Wolff |
| 7,062,570 B2 * | 6/2006 | Hong et al. ................... 709/238 |
| 7,080,378 B1 | 7/2006 | Noland et al. |
| 7,177,901 B1 | 2/2007 | Dutta |

(Continued)

FOREIGN PATENT DOCUMENTS

| JP | 2002132742 | 5/2002 |
| TW | 387007 B | 4/2000 |

(Continued)

OTHER PUBLICATIONS

USPTO Notice of allowance for U.S. Appl. No. 10/526,810 dated Dec. 16, 2010.

(Continued)

*Primary Examiner* — David Rines
(74) *Attorney, Agent, or Firm* — Yee & Associates, P.C.; Lisa Ulrich

(57) ABSTRACT

A system, method and program product for providing a policy hierarchy usable in an enterprise system having at least one computer cluster. A request is sent to a jurisdictional authority for requesting that a resource be added to the computer cluster of the enterprise system. Following predetermined rules, the jurisdictional authority determines if the addition of said requested resource to said computer cluster is to be allowed. If the addition is determined to be allowed by the jurisdictional authority, the requested resource is added to the computer cluster by a computer cluster manager.

18 Claims, 5 Drawing Sheets

(56) References Cited

U.S. PATENT DOCUMENTS

| | | |
|---|---|---|
| 7,426,551 B1* | 9/2008 | Benzinger et al. ............ 709/223 |
| 7,570,587 B1 | 8/2009 | Wilson et al. |
| 7,590,746 B2* | 9/2009 | Slater et al. ................. 709/229 |
| 7,930,397 B2 | 4/2011 | Midgley |
| 2002/0002602 A1 | 1/2002 | Vange et al. |
| 2002/0002611 A1 | 1/2002 | Vange |
| 2002/0032768 A1 | 3/2002 | Voskuil |
| 2002/0032787 A1 | 3/2002 | Overton et al. |
| 2002/0049841 A1* | 4/2002 | Johnson et al. ............. 709/225 |
| 2003/0014507 A1 | 1/2003 | Bertram et al. |
| 2003/0051187 A1 | 3/2003 | Mashayekhi et al. |
| 2003/0084159 A1 | 5/2003 | Blewett |
| 2003/0120529 A1 | 6/2003 | Honarvar et al. ................. 705/7 |
| 2003/0125979 A1 | 7/2003 | Dangler et al. ................... 705/1 |
| 2003/0126202 A1 | 7/2003 | Watt |
| 2003/0149610 A1 | 8/2003 | Rowan et al. .................. 705/10 |
| 2003/0187717 A1 | 10/2003 | Crites et al. .................... 705/10 |
| 2004/0019680 A1 | 1/2004 | Chao et al. |
| 2004/0148211 A1 | 7/2004 | Honarvar et al. |
| 2004/0181794 A1 | 9/2004 | Coleman et al. |
| 2005/0096950 A1 | 5/2005 | Caplan et al. |
| 2005/0228856 A1 | 10/2005 | Swildens et al. |
| 2006/0168224 A1 | 7/2006 | Midgley |
| 2010/0005175 A1 | 1/2010 | Swildens et al. |

FOREIGN PATENT DOCUMENTS

| | | |
|---|---|---|
| TW | 439028 B | 6/2001 |
| WO | 0062502 | 10/2000 |

OTHER PUBLICATIONS

USPTO office action for U.S. Appl. No. 10/526,810 dated Jul. 2, 2010.

USPTO final office action for U.S. Appl. No. 10/526,810 dated Nov. 25, 2009.

USPTO office action for U.S. Appl. No. 10/526,810 dated May 22, 2009.

USPTO final office action for U.S. Appl. No. 10/526,810 dated Jan. 8, 2009.

USPTO office action for U.S. Appl. No. 10/526,810 dated Aug. 1, 2008.

USPTO final office action for U.S. Appl. No. 10/526,810 dated Jan. 23, 2008.

USPTO office action for U.S. Appl. No. 10/526,810 dated Aug. 8, 2007.

Yoshimura et al., "A Datacenter Platform for Improving Response on Web Access Peaks" Technical Report of the Institute of Electronics, Information and Communication Engineers (IEICE) Oct. 4, 2001, vol. 101, No. 339, pp. 33-40 (translation of abstract).

* cited by examiner

PROVIDING A POLICY HIERARCHY IN AN ENTERPRISE DATA PROCESSING SYSTEM

FIELD OF THE INVENTION

This invention relates to an enterprise wide policy hierarchy, and more particularly to brokering decisions based on jurisdiction between policy engines in an enterprise data processing system.

BACKGROUND OF THE INVENTION

As business needs and infrastructure requirements become more complex, applications are required to contain more "intelligence" about their surroundings, about how the application should behave, and about how the application should interact with the infrastructure around it. As a result, many applications end up creating an embedded "policy engine" to serve these needs.

Initially, this was reasonable approach; however, as complexity of applications increased and as policy engines proliferated collisions between policies have increased. It is not uncommon to have 5 or 10 of these applications with policy engines operating in a variety of contexts (e.g. Tivoli Intelligent Orchestrator, DB2, WebSphere, etc). Tivoli, DB2 and WebSphere are software packages available from International Business Machines Corporation of Armonk, N.Y. When these applications participate in an enterprise-wide decision there is high potential for them to be operating at cross purposes that would negatively impact the entire corporation. There is not a current method to arbitrate between policy making engines, nor is there a common method to manage hierarchies of policies. As business needs and infrastructure requirements become more complex, applications are required to contain more "intelligence" about their surroundings, about how the application should behave, and about how the application should interact with the infrastructure around it. More importantly there is need to reflect the business process flow and less the installer's configuration settings. As a result, many applications turned to using embedded policy engines.

U.S. Patent Application Publication US 2003/0120529 A1 published Jun. 26, 2003 by Hornavar et al. for VERSIONING IN A RULES BASED DECISION MANAGEMENT SYSTEM discloses a computer implemented decision management system which provides stragegy versioning by creating different strategy versions and selecting, without technical intervention, a respective strategy version of the created versions, applying, without technical interventions, the selected strategy version to determine interaction strategies, monitoring performance based on the determined interaction strategies, and refining the selected strategy version in accordance with the monitored performance.

U.S. Patent Application Publication US 2003/0125979 A1 published Jul. 3, 2003 by Dangler et al. for METHOD FOR FLEXIBLE DEFINITION AND RETRIEVAL OF BEHAVIOR AND DATA APPLICABLE TO MULTIPLE PARTICIPATING PARTIES discloses a method for guiding the decision making process prior to a company entering into an aggrement or engaging in a transaction or conducting a business event. Policies, factors, weights, and relative priorities for the factors are established for each kind of agreement, transaction or event.

U.S. Patent Application Publication US 2003/0149610 A1 published Aug. 7, 2003 by Rowan et al. for METHOD OF STRATEGIC PLANNING discloses a method for strategic planning by an entity which includes assessing a current status of the entity to use as a basis to establish a development direction for the entity.

U.S. Patent Application Publication US 2003/0187717 A1 published Oct. 2, 2003 by Crites al. for METHOD FOR MARKETING STRATEGY OPTIMIZATION discloses a marketing strategy optimization method which includes organizing a marketing strategy by plans and programs with each of the plans and programs having input metrics having a causal relationship to output measurement that describe the outcome of the strategy. Optimization includes determining input measurement that optimizes a given output for the strategy.

U.S. Patent Application Publication US 2004/0148211A1 published Jul. 29, 2004 by Honarvar et al. for DECISION MANAGEMENT SYSTEM WITH AUTOMATED STRATEGY OPTIMIZATION discloses an apparatus and method for automatically optimizing a strategy of a decision management system. A computer-implemented decision management system applies a strategy to determine actions to be taken, monitors performance based on the taken actions, and refines the strategy in accordance with the monitored performance.

U.S. Patent Application Publication US 2005/0096950 A1 published May 5, 2005 by Caplan et al. for METHOD AND APPARATUS FOR CREATING AN EVALUATING STRATEGIES discloses a method and apparatus for strategy science methodology involving computer implementation which includes a well-defined set of procedures for carrying out a full range of projects to develop strategies for clients.

SUMMARY OF THE INVENTION

This present invention provides a method of structuring a hierarchy of policy engines and allows for the notion of "jurisdiction" to govern how decisions are made and carried out at an enterprise level. Further, the present invention focuses on providing an enterprise wide "policy hierarchy" with the ability to broker decisions based on jurisdiction and what is good for the company overall. Jurisdiction may be defined as "the power, right, or authority to interpret and apply the law; the limits or territory within which authority may be exercised".

For example, assume an Enterprise System's Delivery organization is broken up by geography (e.g. Americas, Asia Pacific (AP), and Europe-Middle East-Asia (EMEA)), each of these geographical organizations has an on demand infrastructure servicing multiple customers. For the sake of this example, assume each geography makes up a "jurisdiction" (jurisdictions may be classified given a variety of other contexts). For this example assume a policy engine (e.g. TIO) within AP indicates that a large amount of hardware is required to satisfy the demand of a customer. In order to fulfill this request, AP needs to provision hardware that is outside of its jurisdiction, EMEA for example. Meanwhile, EMEA is busy servicing its own on demand customers (using a variety of other Policy Engines) and is consuming the hardware that AP is about to request. The present invention has the ability to broker the requests between these two (and other) policy engines to determine who has a greater need for the hardware based on a higher-level of policy authority. For example, assume the customer in EMEA has a contract value that exceeds that of the AP customer. Perhaps the AP customer is a reference-able account, or is about to extend their contract. These and other variables (including Service Level Agreements (SLA), metrics, and other input collected by the initial policy engine)

may be weighted into a policy decision that can be evaluated corporate-wide. As is well known, an SLA is a formal written agreement made between a service provider and a service recipient. The SLA defines the basis of understanding between the two parties for delivery of the service itself Overall, this "manager-of-managers policy engine" has the ability to aggregate the directions of other policy engines to broker a decision based on who has the greater need for a desired action. These decisions may be based on a variety of factors, including business policies, hierarchical SLAs, contract value, and overall value to Enterprise System. The Policy Authority Hiearchy may be broken up by the concept of "jurisdiction". Jurisdiction may be further categorized by geography jurisdiction and subject matter jurisdiction (e.g. Department of Defense, USDA, etc—the subject matter of the data contained within a given resource may alter the typess of decisions that are made).

The implementation of the concept of jurisdiction is an innovation that will provide a method to structure a hierarchy of policy engines, become aware of enterprise wide operations and smoothly govern how decisions are made and carried out at an enterprise level.

Management of policy interactions is rapidly becoming the critical problem in the expansion of policy driven management. Today, most current systems assume one set of policies without the notion of a hierarchy and a method to resolve conflict on an enterprise scale.

It is an object of the present invention to present an environment providing multiple levels of policy. As enterprise-wide environments become more complex and the desire to reap more utilization from existing assets increases, hierarchical policy enforcement and arbitration will be necessary.

It is a further object of the present invention to provide for policy management that has not heretofore been posited.

It is a further object of the present invention to provide a method for solving the problem without having to go to a uniform architecture (solution is multi-vendor capable).

It is a further object of the present invention to prevent deadlocks, race conditions, and unintended consequences.

It is a further object of the present invention to present a method and system for mapping the system of jurisdiction that is used in Western law, using both subject matter jurisdiction and geographic jurisdiction.

It is a further object of the present invention to present a method and system for embedding the jurisdictional rules in a central engine that can be referenced by any policy engine/program operating in any of the covered jurisdictions.

It is a further object of the present invention to present a method and system wherein the jurisdiction engine manages invocation and execution of any policies executed (or contemplated) in a manner dictated by the relevant jurisdiction.

It is a further object of the present invention to present a method and system in which, during the interception of policy requests by the jurisdiction engine, many will be approved since they are not in conflict and fall within jurisdictional rules; however some will conflict and be overruled. These conflicts that recur are the result of mistuned policies in individual policy executing engines. If these are captured and reported they can be used to retune the offending policy engine to work properly within the enterprise.

It is a further object of the present invention to provide a method and system wherein the solution platform is agnostic and architecture independent.

It is a further object of the present invention to present a method and system wherein the policy systems under management are not enabled to check with jurisdictional authority by means of a "built-in call", but rather the disparate policy engines are registered. This registration mechanism will enable the ability to "hook" into all policy invocation, execution, and operation calls. These calls may then be intercepted and interrogated by the jurisdictional authority, providing the ability to permit, deny, or alter the call according to the authority.

It is a further object of the present invention to present a method and system wherein the policy systems under management are enabled, the jurisdictional ranking are encoded into the policy and executed within unambiguous circumstances, and wherein if the circumstances are ambiguous, the jurisdictional authority is queried System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
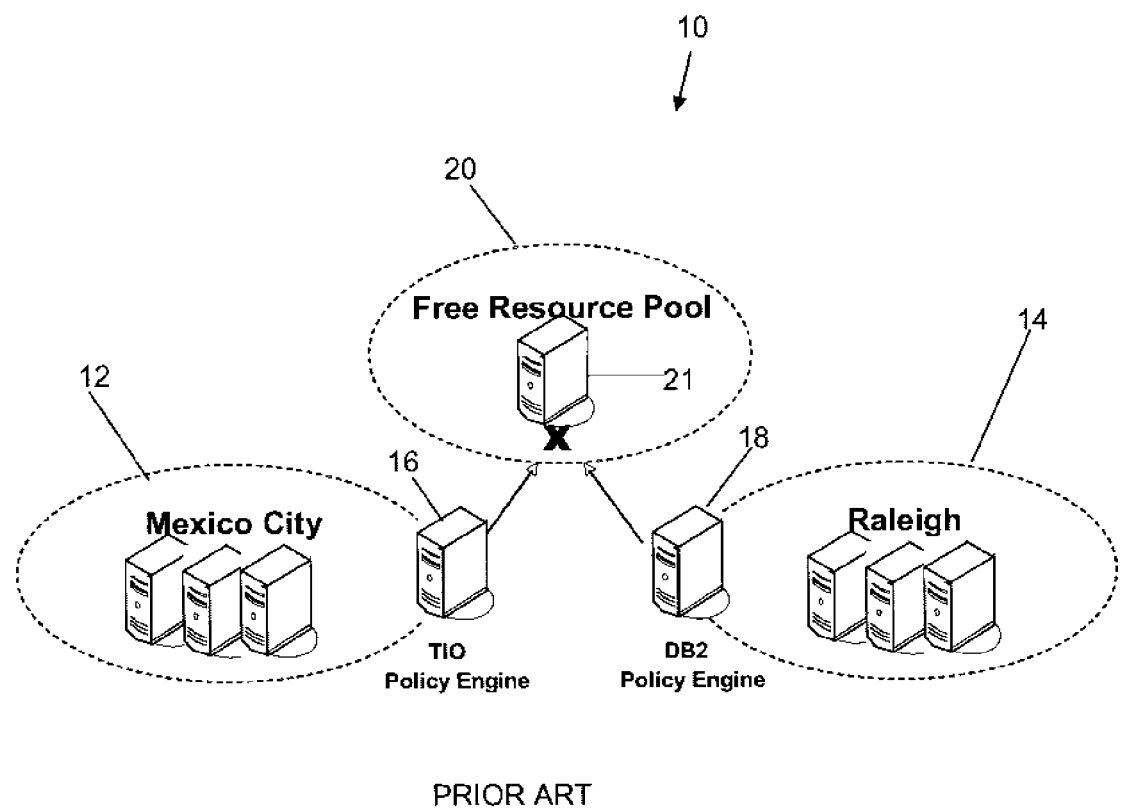
FIG. 1 illustrates a prior art Enterprise System which assumes one set of policies without the notion of a hierarchy and a method to resolve conflicts on an enterprise scale.

FIG. 1 illustrates a prior art Enterprise System 10 divided into two geographic areas 12 and 14. Each geographic area 12 and 14 has a policy engine 16 and 18, respectively. For instance, the area 12 represents Mexico City, which is part of AP and includes a Tivoli Intelligent Orchestrator (TIO) policy engine 16, and area 14 represents Raleigh which has a DB2 policy engine 18. The Enterprise System 10 also includes a free resource pool 20 which includes those resources which may be available to the areas 12 and 14. If both of the policy engines receive a request for a resource such as a server 21 which is available in the free resource pool 20, the prior art system 10 has only one set of policies without a hierarchy, and a conflict occurs, and a deadlock or race condition may result.

Figure 2:
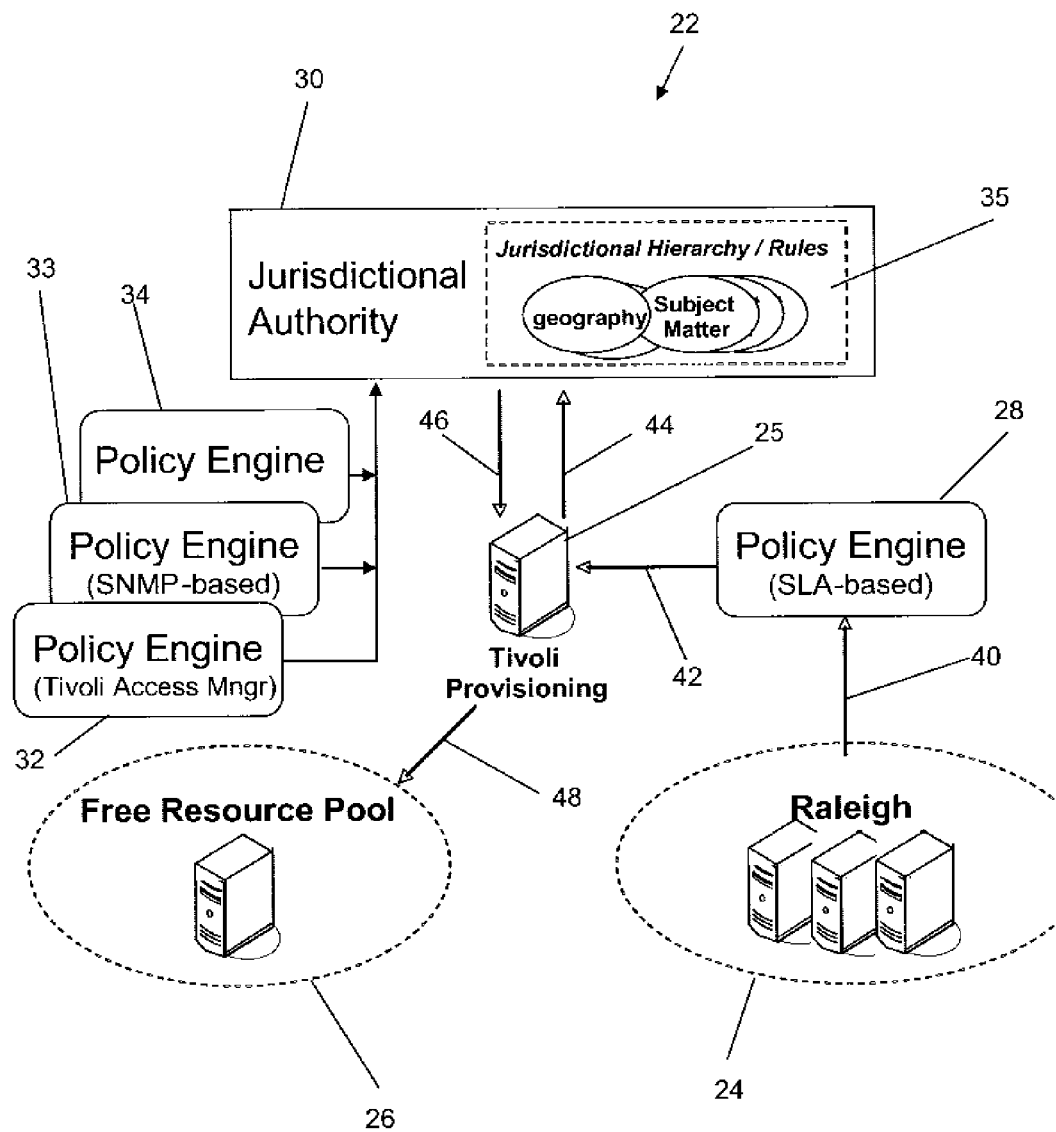
FIG. 2 illustrates a simple enterprise system in which jurisdictional authority is used to add additional resources to a cluster of computers.

FIG. 2 illustrates an Enterprise System using the present invention wherein the system 22 includes at least one cluster of computers 24, a manager 25, such as a Tivoli Provisioning Manager, a free resource pool 26, a policy engine 28 for making requests of the manager 25 for additional resources, and a jurisdictional authority 30 which processes requests for resources. The system 22 includes other policy engines 32, 33, and 34 which may include, but is not limited to, other Tivoli Access Manager based engines 32, SNMP based policy engines 33, and other policy engines. The policy engines 32, 33, and 34 also send requests to the jurisdictional authority 30 requesting resources from the resource pool. The jurisdictional authority 30 processes for resources in the context of other requests for the same resource, or related inquiries. The jurisdictional authority 30 mediates between two or more requests for related resources according to jurisdictional rules and logic. Further, the jurisdiction authority 30 pattern requests and reports potentially erroneous policies to the individual policy executing engines 28, 32, 33, and 34. The jurisdictional authority 30 processes requests in accordance with jurisdictional hierarchy/rules 35 base on, for example, geography 36 and/or subject matter 37. Other rules used by the jurisdictional authority might include such things as law, SLA terms, customer priorities, language, etc.

The following scenario is one example as to how the system 22 works. Other more complex scenarios may be implemented by one of skill in the art. At 40, a high volume of web transactions triggers an event to a policy engine measuring SLA metrics for a web cluster 24. In order to avoid an SLA breach, the SLA-based policy engine 28 sends a signal to Tivoli's Provisioning Manager 25 at 42 to add additional web resources to the Raleigh web cluster 24. Before executing on the provisioning request, at 42 the Tivoli Provisioning Manager 25 queries the Jurisdiction Authority 30 asking for permission to execute the provisioning operation. The Jurisdiction Authority 30 processes the request in the context of other requests for the same resource, or related inquiries. The Jurisdiction Authority 30 mediates between two or more requests for related resources and applies "jurisdiction" rules and logic 35 to the requests. The Jurisdiction Authority 30 also determines patterns of the requests and report potentially erroneous policies in individual policy executing engines 28, 32, 33, and 34. At 46, the Jurisdiction Authority "grants" the authority to provision a server. At 48, the Tivoli Provisioning Manager 25 executes a provisioning workflow.

Figure 3:
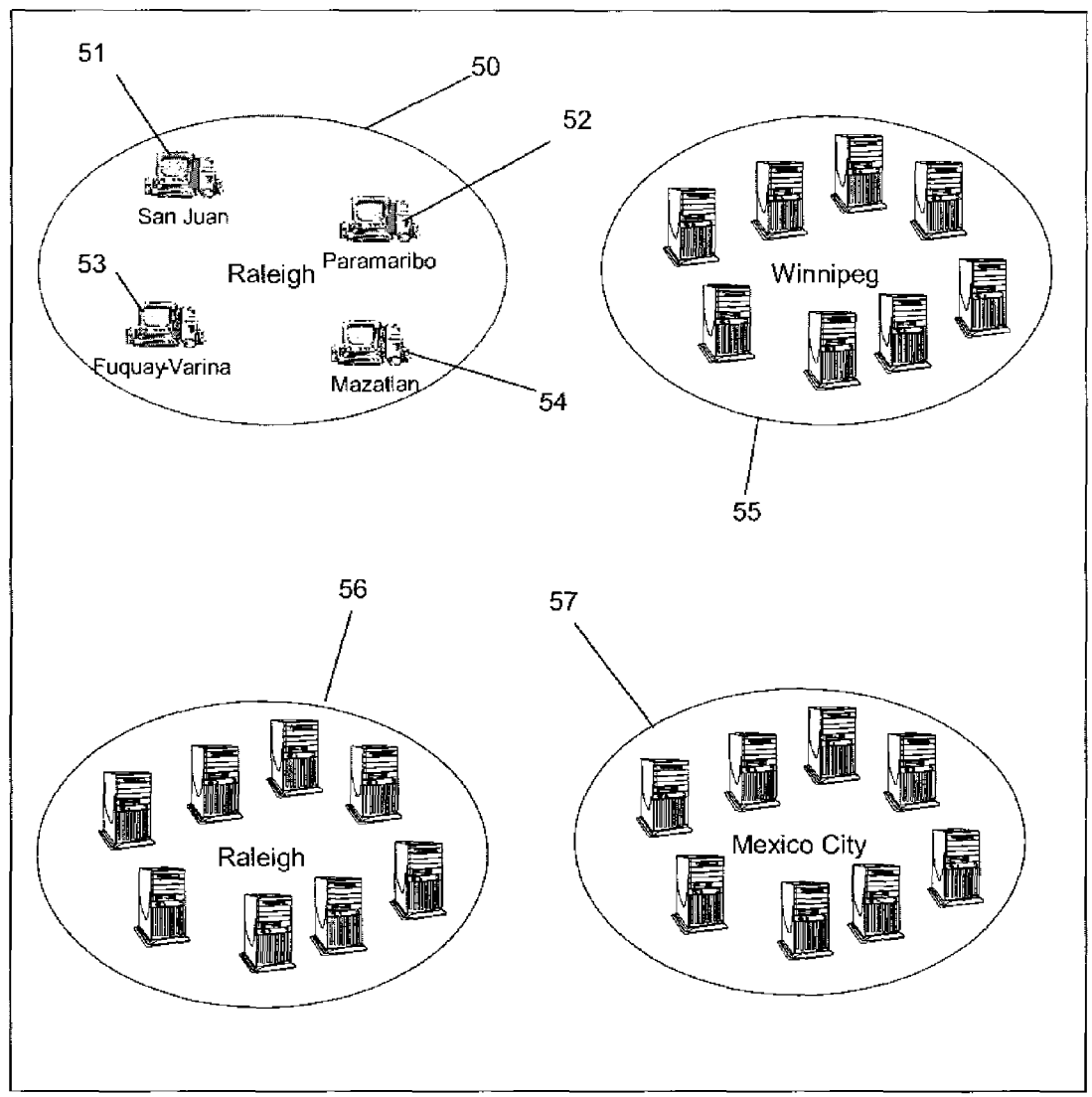
FIG. 3 shows an enterprise system illustrating geographical jurisdiction.

FIG. 3 is an illustration wherein the system 22 of FIG. 2 is broken into geographic areas which is used in the jurisdictional hierarchy/rules 35 of the jurisdictional authority 30. The web cluster 50 is assigned to Raleigh and includes the computers for San Juan 51, Paramaribo 52, Fuquay-Varina 53, and Mazatlan 54. The system 22 also includes a web cluster 55 assigned to Winnipeg, another web cluster 56 also assigned to Raleigh, and a web cluster 57 assigned to Mexico City. The rules 35 are established to give priority, for instance, to one web cluster over another, to computers in the web cluster from which a request comes. For instance, the rules may establish that all requests for resources will first be assigned to the computer at Mazatlan 54 before the other computers in the cluster 50, or may establish that all requests for resources be assigned to the cluster 56 before being assigned to other web clusters. These rules may be varied according to the time of day when the request is receiver, or other criteria, as desired.

Figure 4:
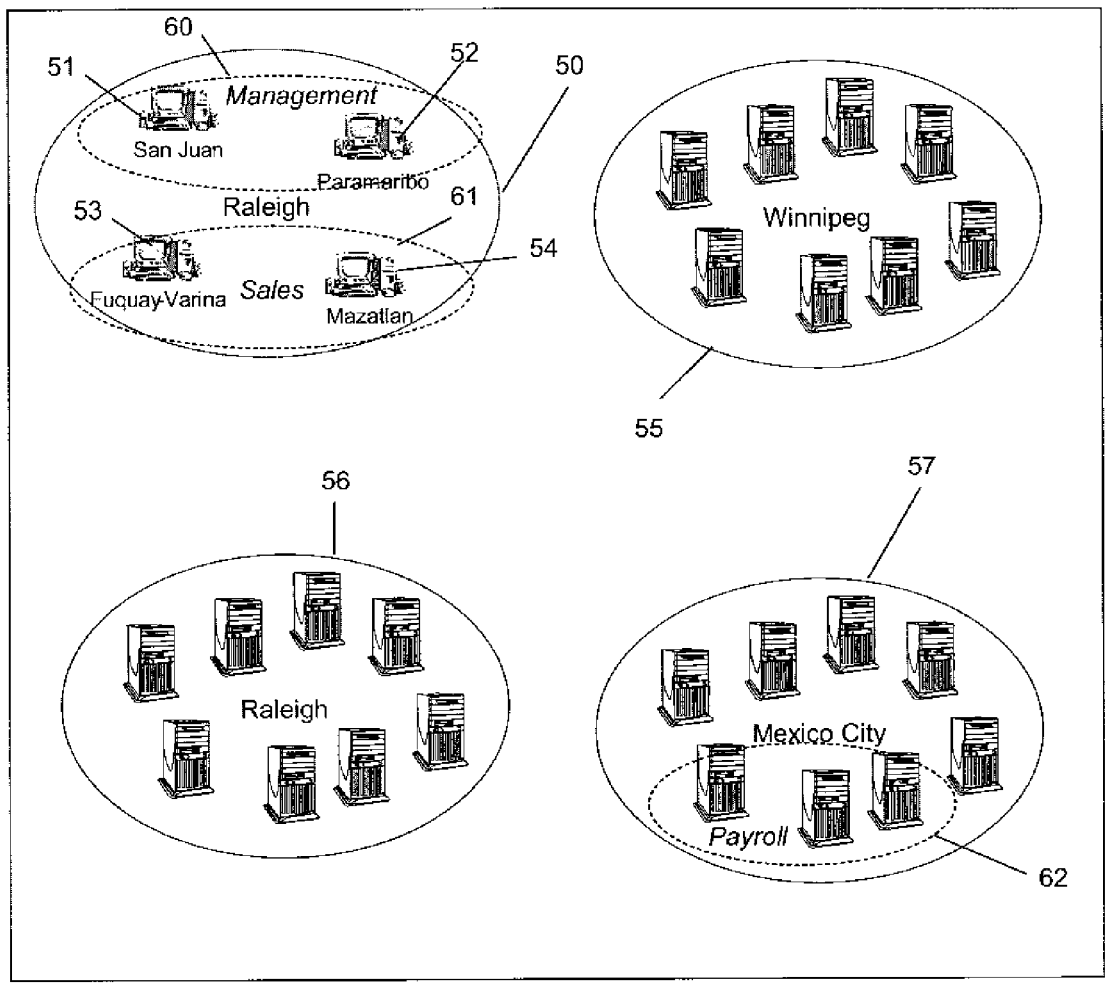
FIG. 4 shows an enterprise system illustrating subject matter jurisdiction.

FIG. 4 illustrates an example of subject matter rules in the jurisdictional hierarchy/rules 35 of the jurisdictional authority 30 of FIG. 2. The rules illustrated in FIG. 4 establish that if a request comes from a computer executing management functions, the request will be assigned to a sub-cluster 60 of web cluster 50. As shown, the sub-cluster may be made up of computers 51 and 52. Similarly, requests related to sales are assigned to computers 53 and 54 of sub-cluster 61 or cluster 50. If the request is related to payroll, the request is assigned to the sub-cluster 62 of cluster 57. The jurisdictional hierarchy/rules 35 may be further implemented in cross-cut jurisdictions based on the dynamics of the environment and governing methodologies, as desired.

Figure 5:
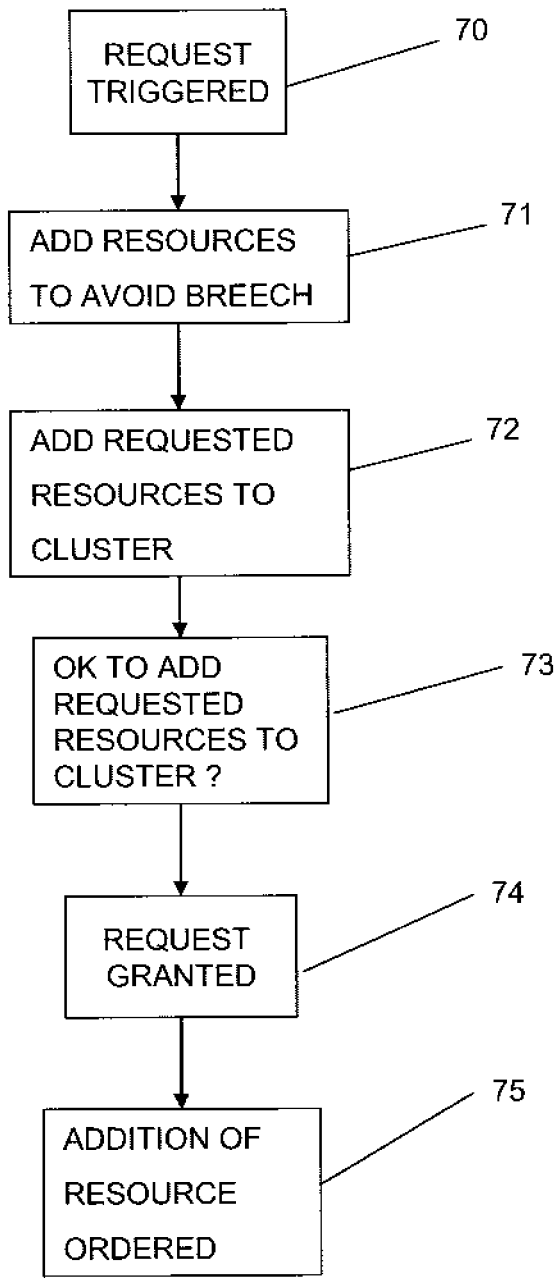
FIG. 5 is a flowchart of the process of the present invention for adding additional resources to a requesting cluster of the system of FIG. 2.

FIG. 5 is a flowchart of the process to assign a requested resource to a requesting computer or web cluster. At 70, a triggering event, such as high volume of web site transactions causes a request for additional resources to be sent to the policy engine. At 71, the policy engine, which is registered with the jurisdictional authority, requests an additional resource. This request may be, for instance, that an additional server be added to avoid a threshold SLA breech. At 72, the policy engine sends a request to the provisioning computer requesting that the resource be added. At 73 the provisioning computer sends a request to the jurisdictional authority asking if the resource may be added to the requesting web cluster. At 74, following the established jurisdictional hierarchy/rules, the jurisdictional authority grants the request. At 75, the provisioning manager orders the addition of the requested resource to the requesting web cluster, such as provisioning additional servers to the requesting cluster.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for processing requests for a resource in an enterprise system having a plurality of computer clusters, the method comprising:

registering with a jurisdictional authority having jurisdictional rules embedded within for managing requests for the resource, by a computer of the enterprise system, disparate policy engines comprising a plurality of policy engines to form a hierarchy in which the jurisdictional authority manages the plurality of policy engines for the enterprise system;

intercepting, by the computer using the jurisdictional authority, the requests for the resource that is a member of a free resource pool, managed by a provisioning manager, from the plurality of policy engines to add the resource to the plurality of computer clusters in the enterprise system;

intercepting, by the computer, policy requests associated with the requests for the resource from the provisioning manager for the jurisdictional authority;

selectively modifying, by the computer, the jurisdictional rules according to predetermined criteria including time of day to manage invocation and execution of policies for the plurality of policy engines;

identifying, by the computer using the jurisdictional authority, a jurisdictional ranking encoded into a respective policy associated with the requests;

determining, by the computer using the jurisdictional authority that mediates between two or more of the requests for the resource using the jurisdictional rules and the jurisdictional ranking in a context of the two or more of the requests for the resource, whether to perform an action associated with the requests selected from a group of actions consisting of permit, deny and alter;

in response to the computer determining to permit the requests for the resource, determining, by the computer using the jurisdictional authority, a highest priority computer cluster in the plurality of computer clusters to add the resource using the jurisdictional rules that identify priorities for assigning the resource, the jurisdictional ranking of the respective policy, and an assignment of the plurality of computer clusters to organizations associated with the plurality of policy engines;

in response to the computer determining the highest priority computer cluster in the plurality of computer clusters, adding, by the computer, the resource requested from the free resource pool by the provisioning manager to only the highest priority computer cluster and not adding the resource requested to another computer cluster of the plurality of computer clusters; and in response to the computer determining to deny the requests for the resource, capturing, by the computer using the jurisdictional authority, patterns of the requests for the resource and reporting a potentially erroneous policy to respective policy engines of the plurality of policy engines associated with the requests.

2. The method according to claim 1 further comprising:
another computer, on which a policy engine in the plurality of policy engines is present, monitoring a parameter in a computer cluster in the plurality of computer clusters to determine whether the parameter indicates an approaching breach of a Service Level Agreement (SLA) governing operation of the computer cluster and making the request in the requests for the resource in response to determining that the parameter indicates the approaching breach.

3. The method according to claim 2, wherein the parameter is a trigger threshold measured in the computer cluster.

4. The method according to claim 3, wherein the trigger threshold is a predetermined volume of web site transactions in the computer cluster.

5. The method according to claim 1, wherein the highest priority computer cluster is additionally determined using two or more factors selected from a group consisting of business policies, hierarchical service level agreements, contract value, and overall value to the enterprise system.

6. The method according to claim 1, wherein determining the highest priority computer cluster further comprises:
the computer using a set of input collected by the plurality of policy engines, and wherein the highest priority computer cluster is additionally determined using the set of input collected by the plurality of policy engines in a corporate-wide policy decision regarding use of the resource requested.

7. The method according to claim 1, wherein the jurisdictional rules comprises rules for adding the resource requested using the jurisdictional ranking of the respective policy and the assignment of the plurality of computer clusters to the organizations associated with the plurality of policy engines based on at least one of geographic areas for the organizations and functions of the organizations.

8. The method according to claim 1, wherein the resource requested is not added to any other computer cluster in the plurality of computer clusters by the provisioning manager in response to the jurisdictional authority granting permission to the provisioning manager to provision the resource of the requests from the plurality of policy engines.

9. An apparatus for processing requests for a resource in an enterprise system having a plurality of computer clusters, the apparatus comprising:
a computer, a non-transitory computer-readable storage device, a computer-readable memory, and program instructions stored on the non-transitory computer-readable storage device for execution by the computer via the computer-readable memory to:

register with a jurisdictional authority having jurisdictional rules embedded within for managing requests for the resource, by the computer of the enterprise system, disparate policy engines comprising a plurality of policy engines to form a hierarchy in which the jurisdictional authority manages the plurality of policy engines for the enterprise system;

intercept, by the computer using the jurisdictional authority, the requests for the resource that is a member of a free resource pool managed by a provisioning manager from the plurality of policy engines to add the resource to the plurality of computer clusters in the enterprise system;

intercept, by the computer using the jurisdictional authority, policy requests associated with the requests for the resource from the provisioning manager for the jurisdictional authority;

selectively modify, by the computer, the jurisdictional rules according to predetermined criteria including time of day, to manage invocation and execution of policies for the plurality of policy engines;

identify, by the computer using the jurisdictional authority, a jurisdictional ranking encoded into a respective policy associated with the requests;

determine, by the computer using the jurisdictional authority that mediates between two or more of the requests for the resource using the jurisdictional rules and the jurisdictional ranking in a context of the two or more of the requests for the resource, whether to perform an action associated with the requests selected from a group of actions consisting of permit, deny and alter;

determine, by the computer using the jurisdictional authority and using the jurisdictional rules that identify priorities for assigning the resource, the jurisdictional ranking of the respective policy, and an assignment of the plurality of computer clusters to organizations associated with the plurality of policy engines, a highest priority computer cluster in the plurality of computer clusters to add the resource, in response to the computer using determining to permit the requests;

add the resource requested from the free resource pool by the provisioning manager to only the highest priority computer cluster identified and not add the resource requested to another computer cluster of the plurality of computer clusters, in response to the computer determining the highest priority computer cluster in the plurality of computer clusters; and capture, by the computer using the jurisdictional authority, patterns of the requests and report a potentially erroneous policy to respective policy engines of the plurality of policy engines associated with the requests, in response to the computer determining to deny the requests.

10. The apparatus according to claim 9 further comprising:

a policy engine in the plurality of policy engines connected to a computer cluster in the plurality of computer clusters, wherein the policy engine is configured to determine whether the resource is needed by its connected computer cluster and to make the request in the requests for the resource in response to determining that the resource is needed by its connected computer cluster.

11. The apparatus according to claim 10, wherein the policy engine in the plurality of policy engines monitors a parameter in the computer cluster to determine whether the parameter indicates an approaching breach of a Service Level Agreement (SLA) governing operation of the computer cluster.

12. The apparatus according to claim 11, wherein the parameter is a trigger threshold measured in the computer cluster.

13. The apparatus according to claim 12, wherein the trigger threshold is a predetermined volume of web site transactions in the computer cluster.

14. A computer program product for processing requests for a resource in an enterprise system having a plurality of computer clusters, the computer program product comprising:

a non-transitory computer-readable storage device having program instructions stored on the non-transitory computer-readable storage device for execution by a computer, the program instructions comprising:

first program instructions for registering with a jurisdictional authority having jurisdictional rules embedded within for managing requests, by the computer of the enterprise system, disparate policy engines comprising a plurality of policy engines to form a hierarchy in which the jurisdictional authority manages the plurality of policy engines for the enterprise system;

second program instructions for intercepting requests for the resource that is a member of a free resource pool managed by a provisioning manager from the plurality of policy engines to add the resource to the plurality of computer clusters in the enterprise system;

third program instructions for intercepting policy requests associated with the requests for the resource from the provisioning manager for the jurisdictional authority;

fourth program instructions for selectively modifying the jurisdictional rules according to predetermined criteria including time of day to manage invocation and execution of policies for the plurality of policy engines;

fifth program instructions for identifying, using the jurisdictional authority, a jurisdictional ranking encoded into a respective policy associated with the requests;

sixth program instructions for determining, using the jurisdictional authority that mediates between two or more of the requests for the resource using the jurisdictional rules and the jurisdictional ranking in a context of the two or more of the requests for the resource, whether to perform an action associated with the requests selected from a group of actions consisting of permit, deny and alter;

seventh program instructions for determining, using the jurisdictional authority, the jurisdictional rules that identify priorities for assigning the resource, the jurisdictional ranking of the respective policy, and an assignment of the plurality of computer clusters to organizations associated with the plurality of policy engines, a highest priority computer cluster, in the plurality of computer clusters, to add the resource in response to the jurisdictional authority determining to permit the requests;

eighth program instructions for adding the resource requested from the free resource pool by the provisioning manager to only the highest priority computer cluster identified and not adding the resource requested to another computer cluster of the plurality of computer clusters, respectively, in response to determining the highest priority computer cluster in the plurality of computer clusters; and ninth program instructions for using the jurisdictional authority to capture patterns of the requests for the resource and report a potentially erroneous policy to respective policy engines of the plurality of policy engines associated with the requests, in response to determining to deny the requests, wherein the first program instructions, the second program instructions, the third program instructions, the fourth program instructions, the fifth program instructions, the sixth program instructions, the seventh program instructions, the eighth program instructions and the ninth program instructions are stored on the non-transitory computer-readable storage device.

15. The computer program product according to claim 14, wherein a request for the resource is made via a policy engine in the plurality of policy engines connected to a computer cluster in the plurality of computer clusters, and wherein the policy engine is configured to determine whether the resource is needed by its connected computer cluster in response to determining that the resource is needed by its connected computer cluster.

16. The computer program product according to claim 15 further comprising:

tenth program instructions for the policy engine in the plurality of policy engines to monitor a parameter in the computer cluster to determine whether the parameter indicates an approaching breach of a Service Level Agreement (SLA) governing operation of the computer cluster and to make the request in the requests for the resource in response to determining that the parameter indicates the approaching breach, wherein the tenth program instructions is stored on the non-transitory computer-readable storage device.

17. The computer program product according to claim 16, wherein the parameter is a trigger threshold measured in the computer cluster.

18. The computer program product according to claim 17, wherein the trigger threshold is a predetermined volume of web site transactions in the computer cluster.

* * * * *